UNITED STATES PATENT OFFICE.

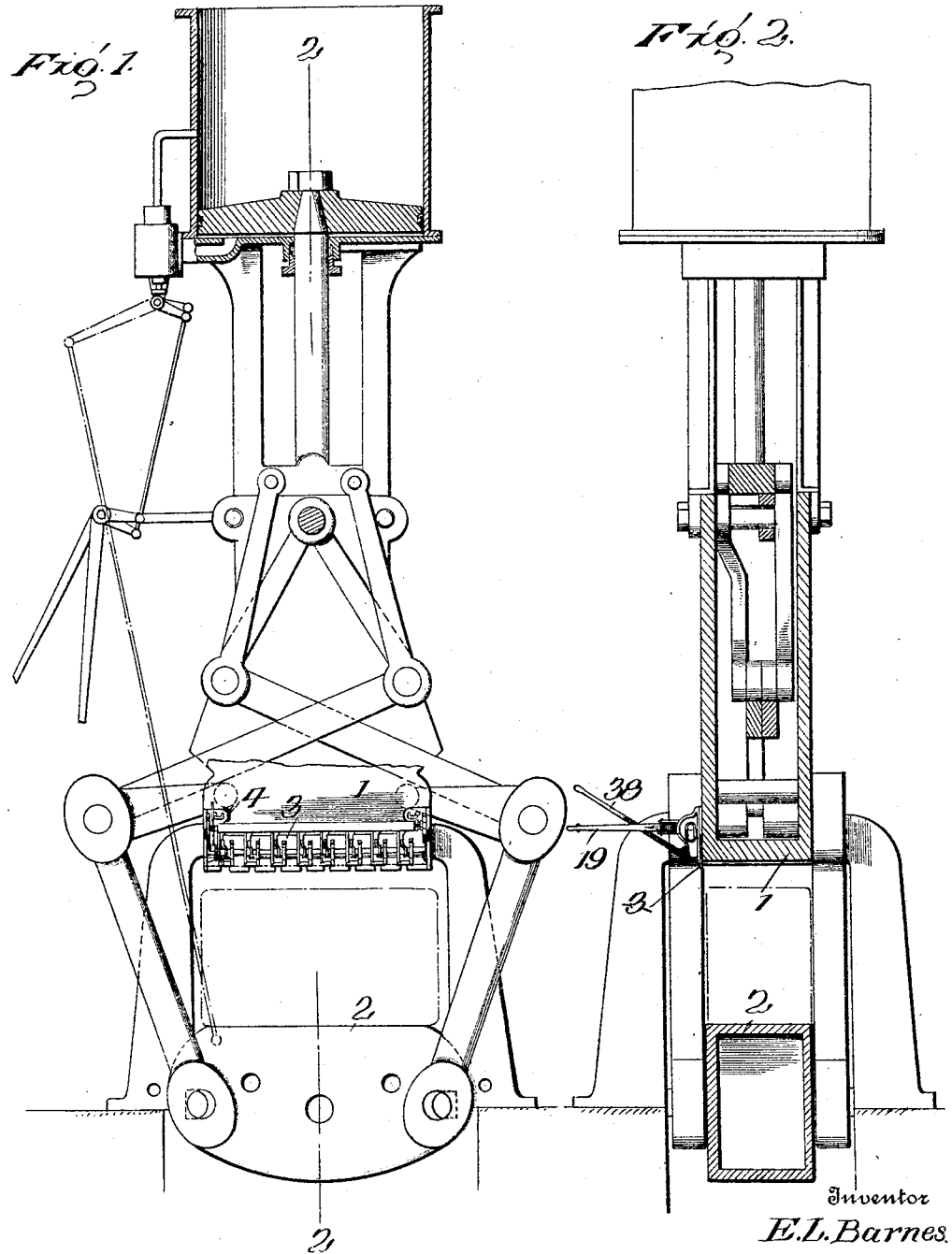

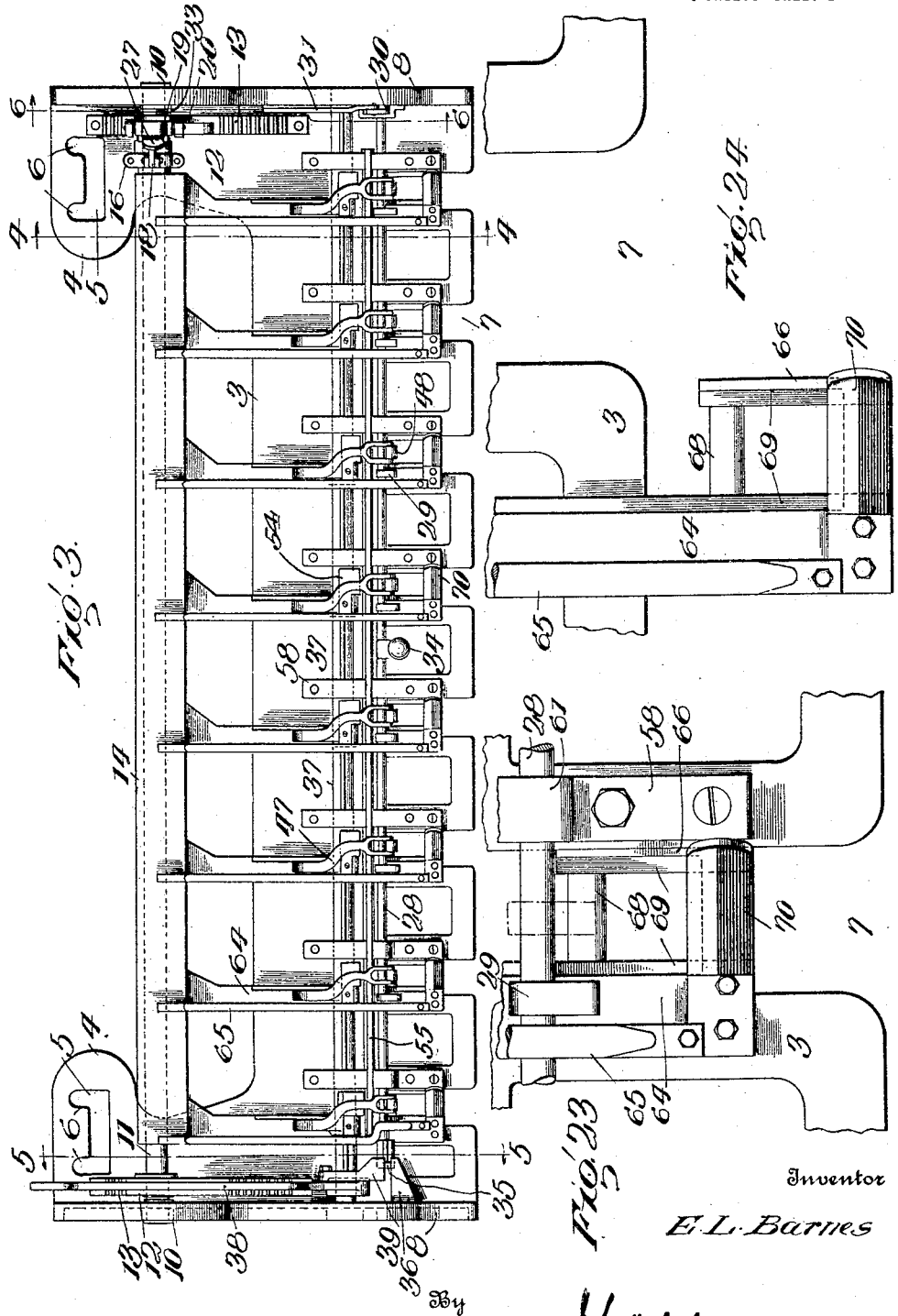

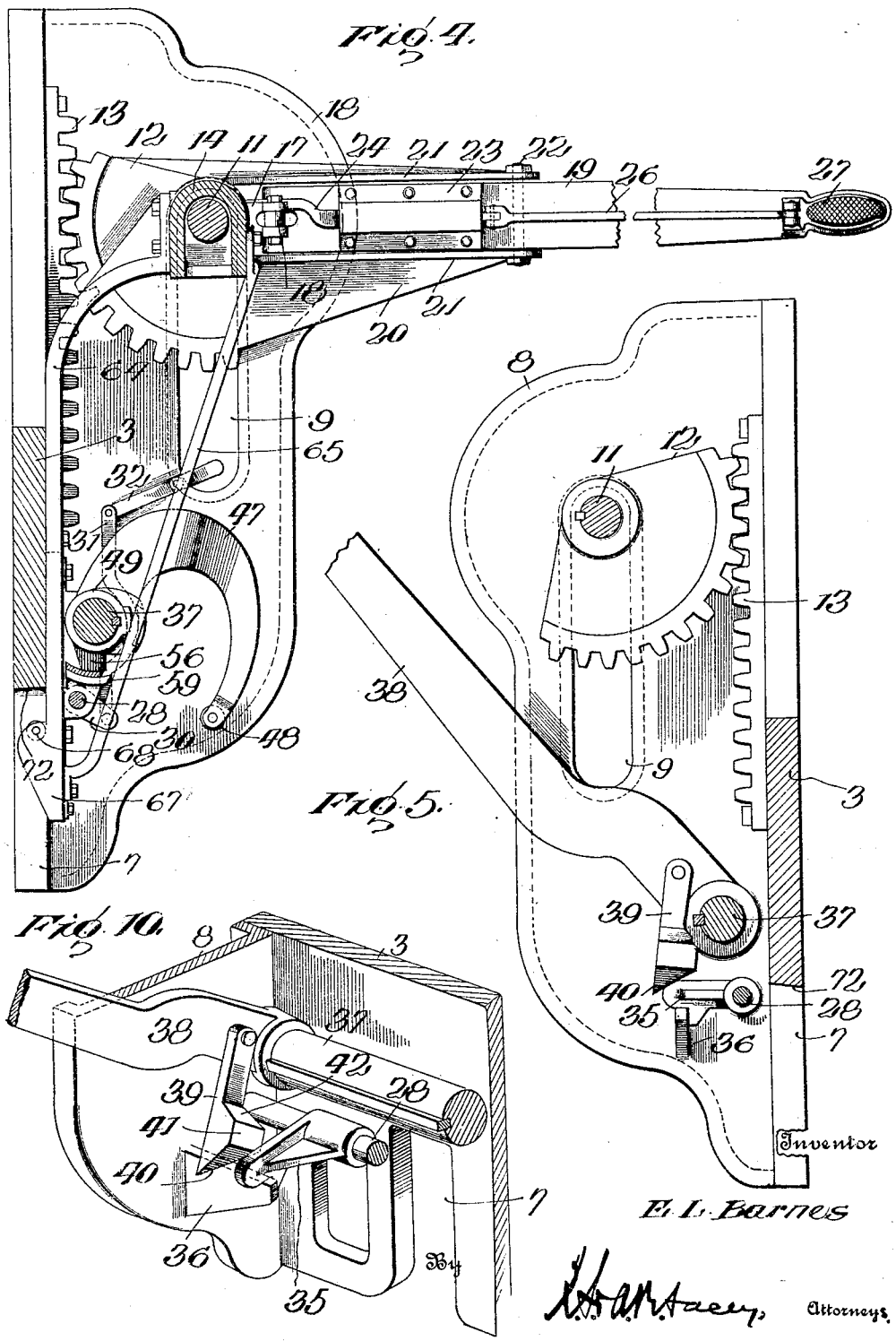

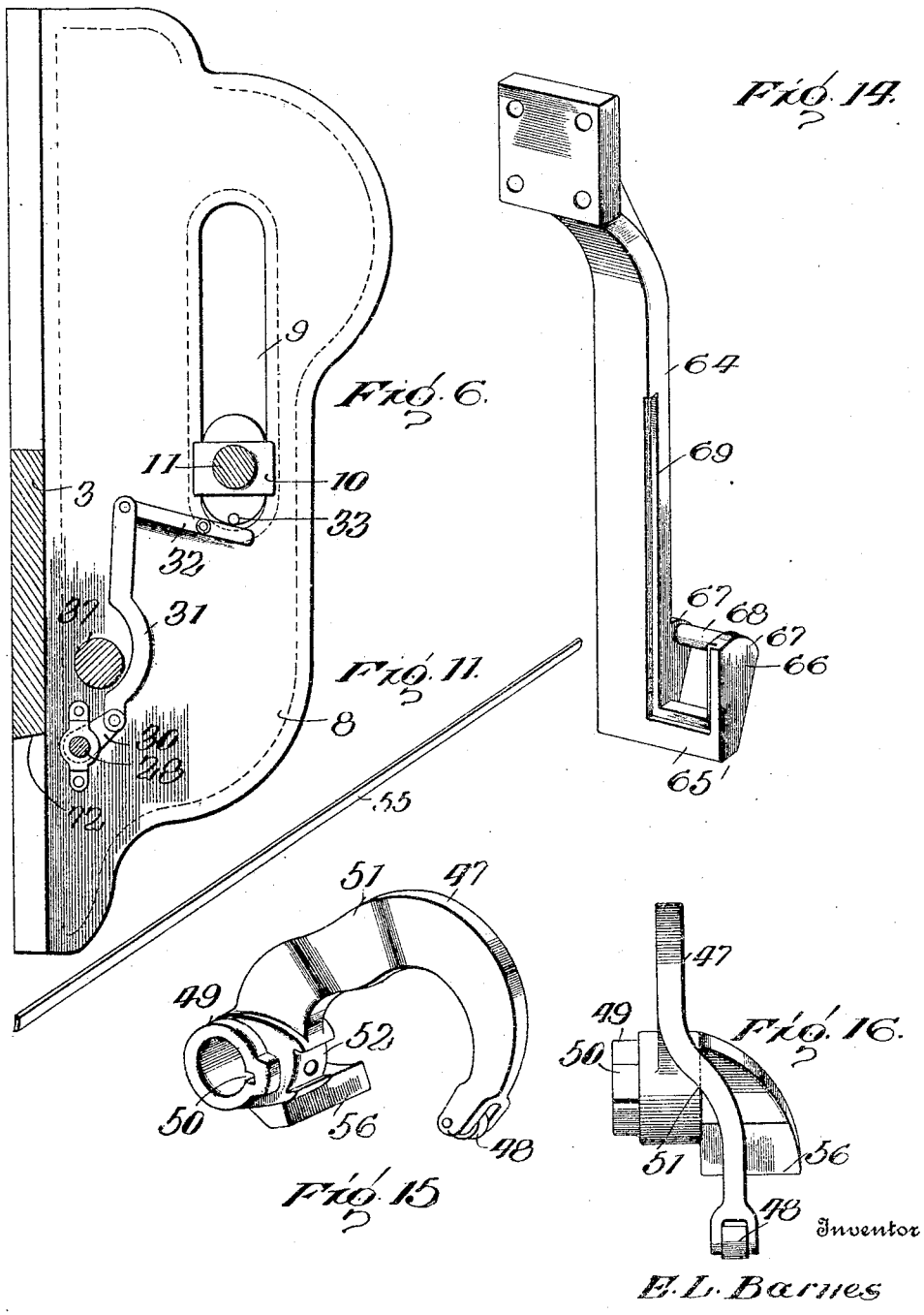

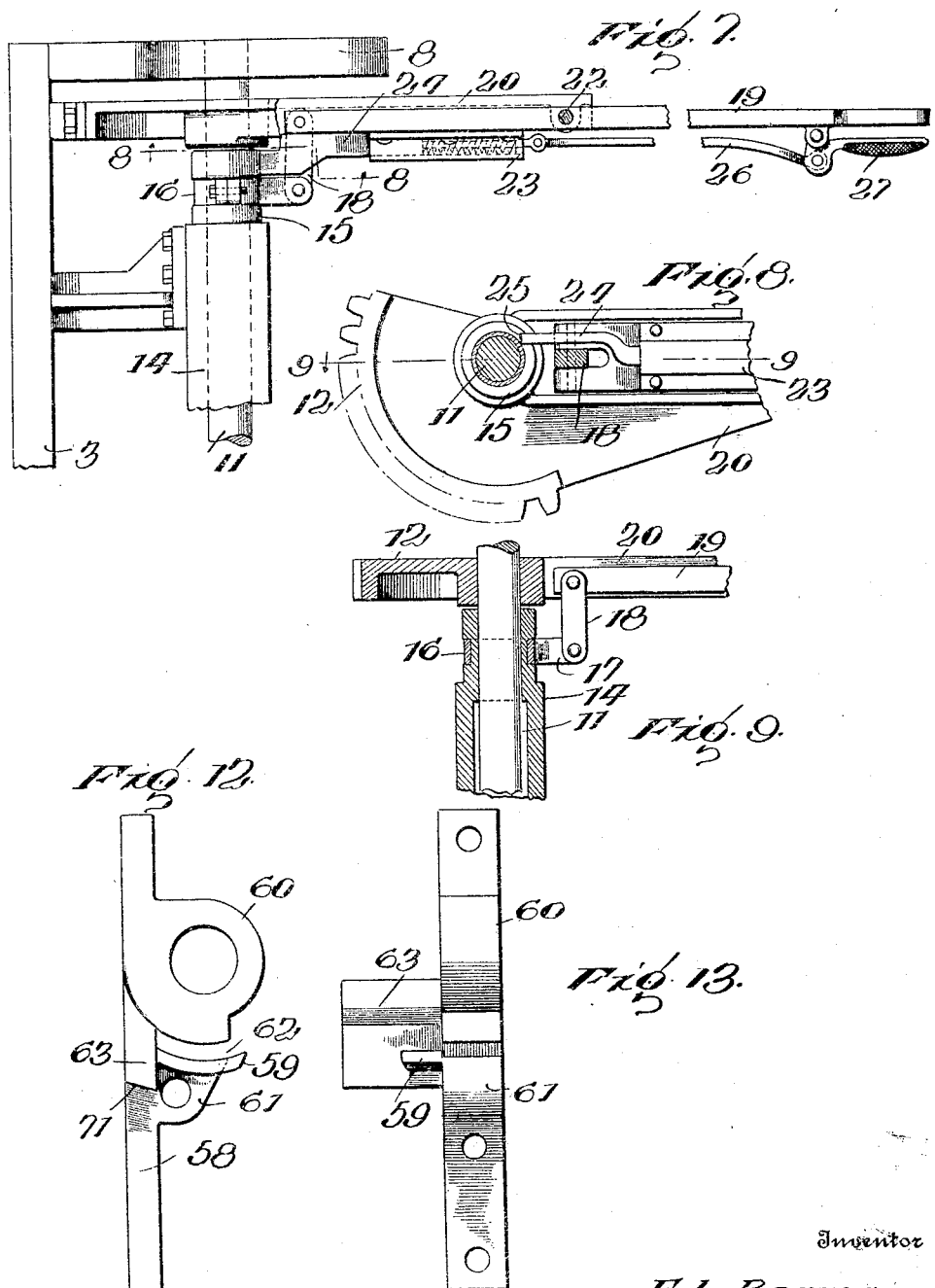

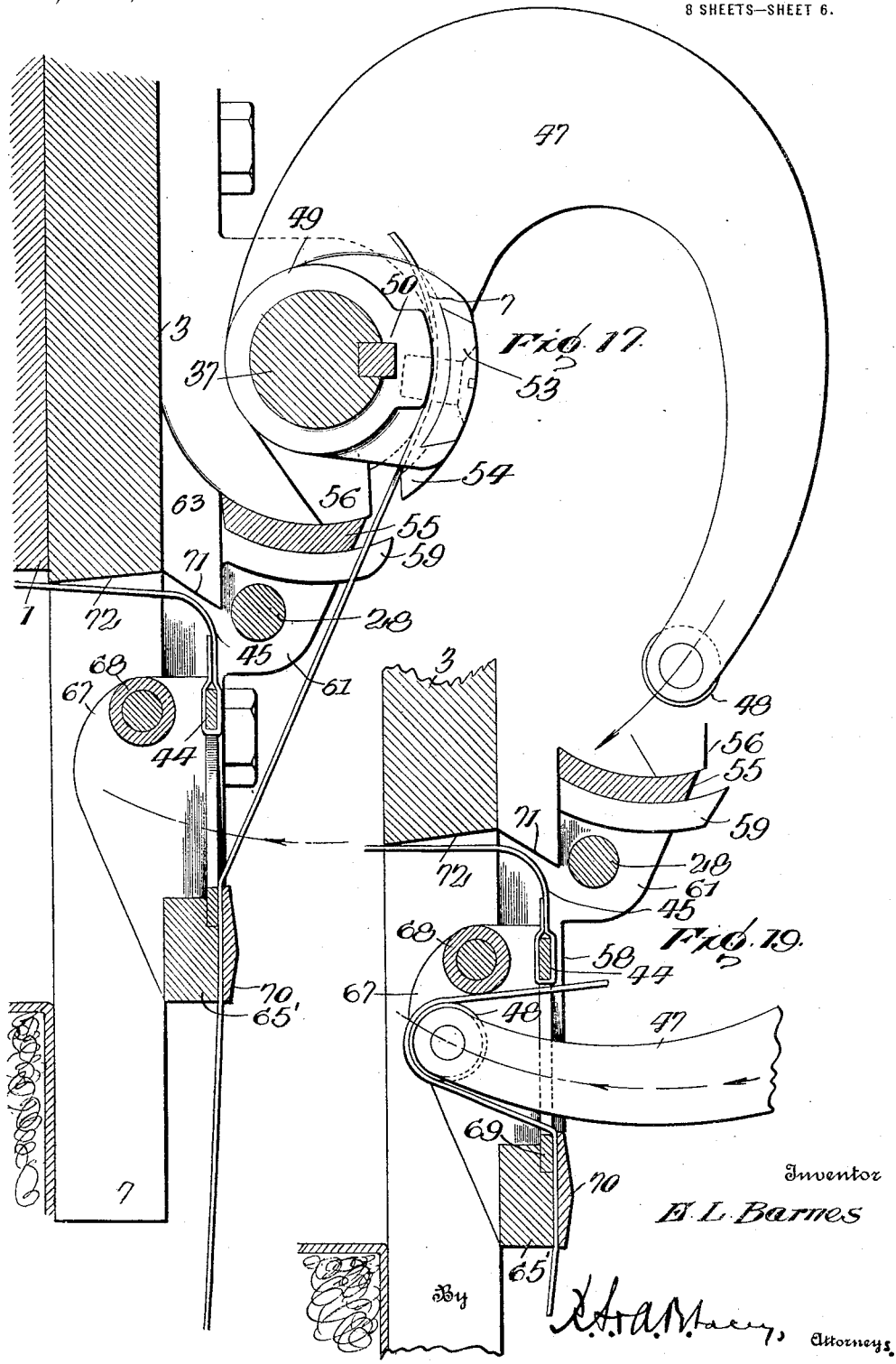

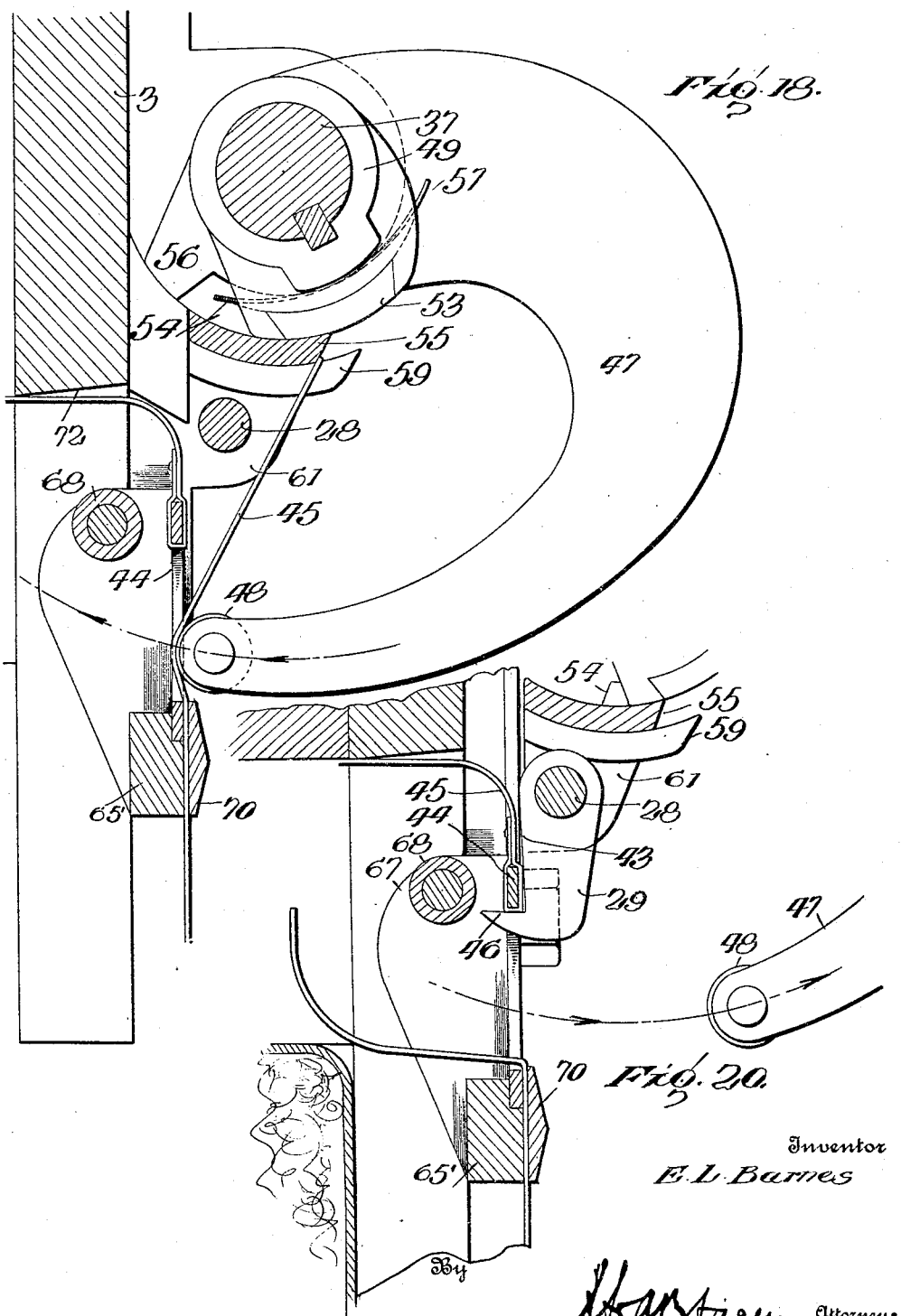

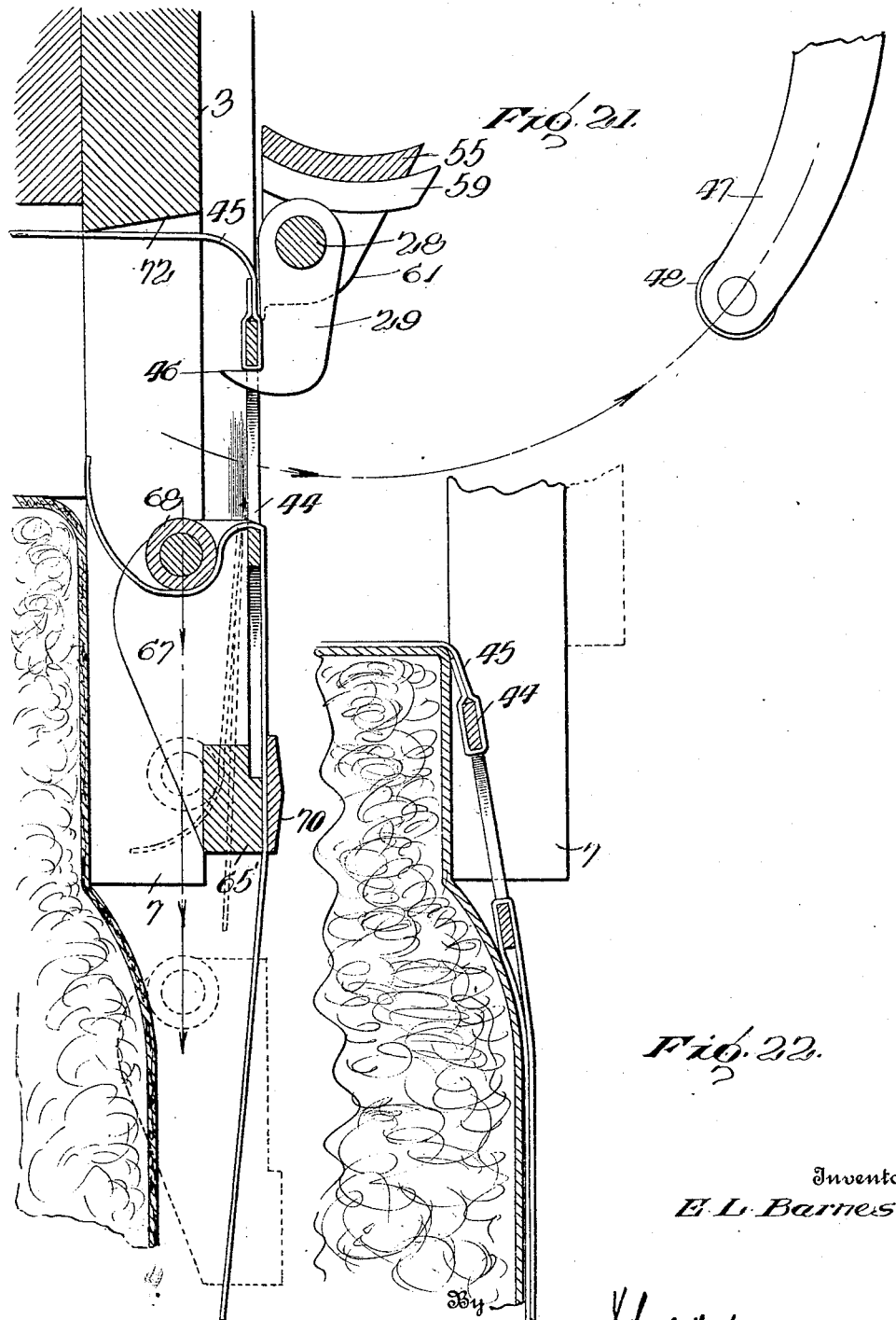

ELVIS L. BARNES, OF HOBART, OKLAHOMA.

MACHINE FOR TYING BALE-BANDS.

1,198,689.

Specification of Letters Patent.    Patented Sept. 19, 1916.

Application filed November 13, 1915.   Serial No. 61,355.

*To all whom it may concern:*

Be it known that I, ELVIS L. BARNES, a citizen of the United States, residing at Hobart, in the county of Kiowa and State of Oklahoma, have invented certain new and useful Improvements in Machines for Tying Bale-Bands, of which the following is a specification.

This invention relates to machinery for tying bale bands and has special reference to mechanism for uniting the free end of a bale band with the buckle after the band has been drawn around a compressed cotton bale.

One object of the invention is to provide means whereby the bands will be accurately spaced so that the pressure will be evenly distributed throughout the bale and a further object of the invention is to provide means whereby the bands will be drawn uniformly around the bale so that the strain will be equal on all bands.

Another object of the invention is to provide means whereby the bands may be cut to uniform length after being placed around the bale and before being tied and also to provide means whereby the surplus severed portions of the bands will be ejected, and a still further object of the invention is to provide means whereby the several coöperating elements will be automatically withdrawn from the buckle so as to permit the bale to be withdrawn from the compress and to return the coöperating parts to proper position to receive a second supply of bands.

The invention also seeks to improve generally the construction and arrangement of the parts of a machine for the stated purpose to the end that the durability and efficiency of the mechanism may be increased.

The several stated objects of my invention, and other incidental objects which will appear as the description proceeds, are attained in mechanism of the type illustrated in the accompanying drawings and the invention resides in certain novel features which will be particularly pointed out in the claims following the description, it being understood that I do not limit myself to the specific details herein shown as various minor changes may be made therein without departing from the spirit or scope of the invention as the same is defined in the claims.

In the annexed drawings: Figure 1 is a sectional elevation of a compress having my improved mechanism applied thereto; Fig. 2 is a sectional view taken on the line 2—2 of Fig. 1; Fig. 3 is a front elevation of my improved mechanism; Fig. 4 is a vertical section taken on the line 4—4 of Fig. 3; Fig. 5 is a section taken on the line 5—5 of Fig. 3; Fig. 6 is a vertical section taken on the line 6—6 of Fig. 3; Fig. 7 is a detail plan view of a portion of the mechanism at one end of the apparatus; Fig. 8 is a detail section on the line 8—8 of Fig. 7; Fig. 9 is a detail section on the line 9—9 of Fig. 8; Fig. 10 is a detail perspective view of a part of the mechanism appearing in Fig. 5; Fig. 11 is a detail perspective view of the stationary knife; Fig. 12 is a detail end view of the cutter support and guide for throwing the free end of the band into proper position; Fig. 13 is a front elevation of the same; Fig. 14 is a detail perspective view of the buckle carrier or ram; Fig. 15 is a detail perspective view of the finger by which the free end of the band is inserted through the buckle; Fig. 16 is a front elevation of the same; Figs. 17 to 22 are enlarged sectional elevations showing the positions assumed by corresponding parts at successive stages of the operation of inserting the free end of the band through the buckle, crimping the same around the buckle and then releasing the same to permit withdrawal of the bale; Figs. 23 and 24 are enlarged front elevations of a portion of the mechanism illustrating different positions of the same.

In Figs. 1 and 2, I have illustrated a Webb compress to show the position of my improved mechanism when the same is in use. It will be noted that the compress comprises a frame upon which are an upper rigid platen 1 and a lower movable platen 2 which is drawn up to the fixed platen under steam or other pressure to compress the bale and then lowered to permit the discharge of the bale after it has been compressed and tied.

In carrying out my invention, I secure to the front side of the upper platen a base plate 3 which has its lower edge projecting slightly below the under surface of the platen so that, when the bale is brought up against said platen, it will be positioned behind the lower edge of said base plate to facilitate accuracy in the insertion of the bands. The base plate 3 is provided at its ends with upwardly extending attaching arms 4, in the upper extremities of which are horizontal slots 5 through which fastening devices may be inserted into the platen or frame of the compress to secure the base plate in position. Ordinarily eight bands are applied to each bale and my mechanism is designed to accommodate eight bands but, if it be desired to apply only seven bands to the bale, the base plate may be shifted endwise so that one bale guide and coöperating mechanism will be beyond the end of the bale and will simply work idle while the remaining sets of elements will be spaced equidistantly from the ends of the bale and thereby attain uniformity in pressure. Inasmuch as the fastening devices are inserted through longitudinal slots, it is obvious that the base plate may be readily shifted endwise and to facilitate adjustment and make for accuracy in the mechanism, I provide notches 6 at the ends of the slots which are adapted to fit over the fastening bolts. The slots will be of such length that, when the bolts are inserted through the notches at one end, eight bands may be applied to the bale and, if the base plate be shifted to engage the other set of notches over the fastening bolts, only seven bands will be applied. In the lower edge of the base plate, I form vertical notches or open-ended slots 7 which constitute guides for the insertion of the bale bands and are, of course, spaced equidistantly along the base plate.

At the ends of the base plate are forwardly projecting flanges or guide plates 8 having vertical slots 9 therein to receive bearing boxes 10 in which is journaled a rock shaft 11 and to said rock shaft, adjacent the ends thereof, are secured the quadrants or segmental gears 12 adapted to engage and ride upon the racks 13 formed on or secured rigidly to the front side of the base plate immediately adjacent said end flanges 8. Mounted slidably upon the rock shaft, and hence carried by the same, is a beam 14 which extends approximately the full length of the base plate and is constructed at one end (the right hand end in the present illustration) with an extension 15 having an annular groove therein which receives a yoke or split collar 16 constructed with a lateral lug 17 to which is pivoted a link 18. The link 18 extends from the said lug 17 to an operating lever 19 to which it is pivoted so that, if the said lever be moved laterally, the beam will be shifted longitudinally upon the rock shaft. The split collar or yoke 16 engaging the annular groove in the cylindrical extension 15 of the beam will transmit lateral movement of the lever to the beam and at the same time will permit the lever to be swung about the rock shaft as a center without affecting the position of the beam. The quadrant 12, adjacent the extension 15, is provided with a forwardly projecting radial arm 20 having parallel flanges 21 formed on its inner face and the end of the lever fits between the said flanges, as shown most clearly in Fig. 4, whereby movement of the lever in a vertical plane will be transmitted directly to the quadrant and cause the same to ride upon the rack bar 13. The lever is pivotally attached intermediate its ends to the outer end of the arm 20, as shown at 22, and this pivotal connection permits the lever to be swung laterally so that the inner end thereof will transmit the before-mentioned longitudinal shifting movement to the beam 14. The lever is also equipped with a guide 23 through which slides a latch 24 adapted at its inner end to engage a notch 25 in the peripheral surface of the extension 15, as shown most clearly in Fig. 8, the latch 24 being connected by a link 26 with a thumb piece or other suitable handle 27 at the outer end of the lever. This latch is held in engagement with the notch 25 when the lever is in its highest position by a spring fitted within the housing or guide 23 in the usual manner and prevents premature release and lowering of the ram and the buckle seat.

Journaled in the end flanges or guide plates 8, below the slots 9 therein, is a rock shaft 28 which is equipped with dogs 29 extending radially therefrom and spaced equidistantly apart and adapted to each engage and support a buckle in the operation of the apparatus as will hereinafter more fully appear. At the end of the said rock shaft, below the lever 19, I secure a crank arm 30 which is disposed at an angle to the dogs on the rock shaft so that, when the dogs are in their lowered position, the crank will extend somewhat forwardly from the rock shaft, as shown in Fig. 4. A link 31 is pivoted to the free end of the crank 30 and extends upwardly therefrom and has its upper end pivoted to the rear end of the lever 32 which is fulcrumed upon the adjacent flange or end plate 8 and has its front end immediately adjacent the lower end of the slot 9. Upon the bearing block 10, immediately above the lever 32, is an inwardly projecting lug or pin 33 which is adapted to strike the front end of the said lever and depress the same thereby rocking the lever to the position shown in Fig. 6 and exerting an upward pull through the link 31 upon the crank 30 and rock shaft 28 so as to withdraw the dogs from the buckles.

At any intermediate point of the rock shaft 28, I hang a weight 34 thereon and this weight will act to rock the said shaft and thereby swing the dogs into engagement with the bale band buckles when the rock shaft is released by the mechanism which I will now describe. At that end of the rock shaft remote from the crank 30, I provide a lug, trip or radial projection 35 which normally rests upon a lug or rest 36 extending laterally from the inner face of the adjacent flange 8, as shown clearly in Fig. 10.

Mounted above the rock shaft 28 is a second rock shaft 37 having a lever 38 secured rigidly thereto and projecting radially therefrom. Pivoted to the said lever is a trigger 39 which has its lower end beveled, as shown at 40, so that, when the lever is swung downward, the said beveled surface 40 will ride upon the free end of the trip 35 and the trigger will swing outwardly so as to clear the trip and the rest 36, as shown most clearly in Fig. 5. As the downward movement of the lever 38 and the trigger continues, the trigger will swing forwardly over the free end of the trip 35, as just stated, and will then swing rearwardly so that the laterally extending portion 41 of the trigger will project under the trip 35 with the upper beveled surface 42 in engagement with the under edge of the trip. Upon the return or upward movement of the lever 38 and the trigger 39, the said beveled surface 42 riding against the trip will push the same laterally from the rest 36 so that the weight 34 will be free to act and will at once drop, rocking the shaft 28 and causing the dogs 29 thereon to swing into engagement with the bale band buckles. The dogs 29, as shown most clearly in Fig. 20, have flat rear faces 43 which are adapted to bear against the flat front face of the buckle 44 and the bale band 45 so as to aid in holding the buckle firmly against the bale and at the free extremity of each dog is an inwardly projecting hook or lip 46 which is adapted to extend through the open portion of the buckle and engage under the upper end or cross bar thereof so as to support the buckle when it has been released from the ram or buckle holder.

Secured to the rock shaft 37 are a series of fingers 47 which are spaced equidistantly longitudinally of the shaft and extend forwardly, downwardly and inwardly, as shown. These fingers 47 are provided preferably with rollers 48 at their free ends so that they may move easily upon the bale band without excessive friction, as will be readily understood. The fingers are provided with hub portions 49 having keyways 50 therethrough so as to be secured firmly to the shaft 37 and they are of an ogee form, as shown at 51, so as to clear the free end of the band when the surplus portion of the band extends upwardly, as shown in Fig. 23, and before the same is trimmed. Upon the hub 49, at the base of the finger, is a recess 52 in which is secured the shank 53 of a knife 54 which is adapted to coöperate with a fixed knife 55 to trim the bale bands. The knife is disposed laterally with respect to the hub 49 and upon the hub I form an ejector 56 which is substantially a blunt-faced lug disposed longitudinally of the hub and spaced from the cutting edge of the knife 54 so that the severed end of the band, indicated at 57 in Fig. 18, will be engaged by the ejector and thrown from the machine upon the reverse movement of the rock shaft 37 by which the finger 47 is withdrawn from the bale band and the buckle as indicated in Fig. 20. This stationary knife 55 may extend the full length of the base plate and is a bar of arcuate cross-sectional contour having its edge beveled, as shown, so as to have a shearing action upon the band which is cut between and engaged by the said edge and the oscillatory knife 54. This knife is supported in suitable lugs or brackets 58 secured upon the front of the base plate and which may also provide intermediate bearings for the rock shafts 28 and 37 so as to prevent bending of said shafts under torsional strain. These brackets or bearings 58 will be disposed at one side of the respective notches 7 and on the sides adjacent the said notches they will be provided with lugs 59 which will serve as guides to facilitate placing of the free ends of the bands in the proper position to be acted upon by the knives.

The brackets, as shown most clearly in Figs. 12 and 13, will be provided with perforated projections or ears 60 to receive the upper rock shaft 37 and the lugs 59 will be disposed at the upper edge of similar smaller ears 61 which receive the lower rock shaft 28. The upper side of the ear 61 will be spaced from the lower surface of the projection 60 and these surfaces will be disposed on concentric arcs, as shown in Fig. 12, whereby to provide a space 62 to receive the stationary knife. Back of the guide 59 is a ledge 63 which aids in supporting the severed end of the band so that it will be properly thrown from the machine by the ejector and will not be permitted to drop behind the rock shafts and become entangled with any of the essential operating elements.

Secured to and depending from the beam 14 at equidistant intervals are a series of plungers or rams 64 which are reinforced so as to be held against bending or breakage by braces 65 extending from the lower ends of the rams to the front sides of the beam as shown most clearly in Fig. 4. These rams or plungers ride upon the front face of the base plate as the beam 14 is moved vertically and at their lower ends they are constructed with lateral offsets 65' having upstanding portions 66 at their extremities disposed parallel with the main portions of the rams. On the rear side of the body of the ram and upon the upstanding portion 66 are lugs 67 which may engage the vertical walls of the notches 7 and thereby aid in guiding the plungers in their vertical movement and prevent premature lateral movement thereof. A roller 68 is journaled in the lugs 67 and is thereby held in spaced relation to the buckle seat while in the front face of the plunger, along the edge thereof and along the front edge of the lateral base member 65' and the end portion 66, is formed a groove 69 to constitute the seat for the buckle. Upon the front face of the plunger is secured a retainer 70 which has its upper edge disposed over the lower horizontal portion of the seat 69 and its free end disposed over the offset 65. It will be readily understood that if the buckle be slipped over the retainer into the seat provided by the groove 69, the retainer will automatically engage the lower end of the buckle and hold the same to its seat.

It will be noted that the under surface of the ledge 63 is beveled upwardly and rearwardly, as shown at 71, to direct the bale band against the downwardly and rearwardly beveled upper wall 72 of the notch 7. The band will thus be guided to its proper position over the bale and will also be caused to exert a tension or pressure upon the buckle which will aid in holding the same to its seat inasmuch as a curved bend will be formed in the band at the upper end of the vertically disposed buckle. Owing to its resiliency, the band tends to unbend and this tendency is resisted by the surfaces 71 and 72 so that it reacts upon the buckle and holds the same seated.

It is thought the operation of my apparatus will be readily understood from the foregoing description taken in connection with the accompanying drawings. In the initial position of the parts, the beam 14 is raised, as shown in Fig. 3, and the plungers or rams carried by said beam are, therefore, in their highest positions with the buckle or seats near the upper ends of the notches 7. The rock shafts 28 and 37 will be in such positions that the crank 30 and the parts connected therewith will be disposed as shown in Fig. 6, and the trip 35 and lever 38 with the fingers 47 will lie as shown in Figs. 4, 5 and 10. The bale is compressed in the usual manner and, while the lower platen carrying the bale is held in its upper position, the bands are inserted through the notches 7 over the bale and then brought back under the bale and up in front of the mechanism herein shown. It will be understood that two gangs of operators are employed at each compress, as heretofore, and that the bands each have one end engaged around one end of the buckle before the bands are inserted through the machine and over the bale. The operators at the front side of the machine insert the bands through the notches 7 below the shaft 28 and above the rollers 68. The buckle has its lower end engaged behind the retainer 70 and is pressed by the thumb of the operator into the seat. The men at the rear side of the machine draw the bands across the bale and insert them through grooves in the platen under the bale toward the front of the machine where the free ends of the bands are caught by the operators at that side. The free ends of the bands are then brought upwardly over the knife 54 and under the fingers 47, assuming a somewhat inclined position momentarily. After a band has been drawn as tightly as the operator can draw it, it is slipped edgewise under the retainer 70 and under the knife 54 so that it will extend between the knife and the rock shaft 37 and alongside the dog 29. The lateral movement of the band to engage it under the retainer will carry it over and past the guide 59 so that the edge of the band will lie against the edge of the said guide and the band will be thereby held over the knife 55 and under the knife 54, as clearly shown in Fig. 17. The head operator will then swing the lever 38 downwardly, thereby rocking the shaft 37 and causing the trigger 39 to move downwardly, as hereinbefore described, and engage under the trip 35 on the rock shaft 28.

The downward movement of the lever 38, with the consequent rocking of the shaft 37, will cause the fingers 47 to swing downwardly and rearwardly against the free portion of the band and impinge against the said band so as to push it through the buckle, as shown in Figs. 18 and 19. Before the fingers push against the bands, the knives 54 will impinge against the bands above the guides 59 and carry the same against the knife 54 so as to sever the end of the band and thereby trim all bands to a uniform length, as shown in Figs. 17 and 18. The downward movement of the lever 38 will be sufficient to carry the fingers 47 rearwardly to a degree sufficient to carry the trimmed ends of the bands under and beyond the rollers 68, as shown in Figs. 19 and 20. The lever is then returned to its initial position so as to withdraw the fingers 47 from the buckles, as shown in Fig. 20, and this return movement of the lever 38 will drive the trip 35 laterally from the rest 36 so that it will at once drop under its own weight, together with the influence of the weight 34, the shaft 28 being thereby shifted longitudinally and then rocked so that the dogs 29 will be carried over and into engagement with the upper ends of the bale buckles, as shown clearly in Fig. 20. The operator at the opposite end of the base plate will then swing the lever 19 downwardly so that the shaft 11 will be rocked and the quadrants 12, consequently, caused to ride downwardly upon the racks 13 so that the several plungers or rams will be lowered and the rollers 68 caused to ride down upon the free ends of the bands and crimp the same over the lower ends of the buckles, the buckles being held in their raised positions by the dogs 29 and, consequently, being withdrawn from their seats. As soon as the lever 19 reaches its lowest position, at which time the free end of the band will be crimped around the buckle, the operator swings said lever laterally so that the beam 14 will be shifted longitudinally of the shaft 11 and thereby carry the several plungers laterally away from the bands and cause the retainers 70 to move from over the bands. See Figs. 23 and 24. When the dogs 29 drop into engagement with the buckles, the lever 32 will assume the position shown in Fig. 4. When the lever 19 is swung downwardly, as just described, the pin 33 will be brought against the free end of the lever 32 as shown in Fig. 6 and will, consequently, vibrate said lever and actuate the link 31 and crank 30 to rock the shaft 28 in a reverse direction and thereby withdraw the dogs 29 from engagement with the buckles 44. When subsequent lateral movement is imparted to the several plungers or rams, one of said plungers will be carried against the weight 34 on the shaft 28 and will act through said weight to shift the said shaft axially and thereby return the trip 35 to its position above the rest 36, consequently restoring the said dogs to a position in which a second set of bands may be inserted. The lever 19 is then swung laterally so as to return the beam 14 to its initial position and thereby bring the rollers 68 into the vertical planes of the notches 7 after which the lever is raised so as to return the plungers to their upper positions, whereupon the apparatus will be ready for a second operation. When the plungers are shifted laterally to withdraw the retainers 70 from the bale bands, the tension upon the bale bands will draw them at once tightly against the bale so that, when the plungers are again shifted laterally to their initial vertical planes, they will be in front of the bands and the bale may then be lowered.

While, for convenience, I have described the several steps of the operation as each following a previous step, it is to be understood that there is no stoppage of the operation at any time and while the several steps are performed successively, the ending of one step and the beginning of a following step are simultaneous and may overlap to some extent. The apparatus is obviously compact in its arrangement and simple in the construction of its parts and will be found highly efficient for the purposes for which it is designed. By the use of my invention, the bands will be tied uniformly so that one band will not be carrying any greater load than any other band and, consequently, the bale will be held under uniform compression. Moreover, the tying operation may be performed very rapidly so that a very pronounced saving of time is effected over the manual tying now generally practised.

While I have illustrated the mechanism applied to a Webb compress, it is to be understood that it may be applied to any compress now in use.

Having thus described the invention, what is claimed as new is:—

1. In an apparatus for the purpose set forth, the combination of means for supporting a bale band buckle with the end of a bale band extending across the same, means for inserting the end of the band through the buckle, and means for crimping said end upon the buckle.

2. In an apparatus for the purpose set forth, the combination of means for supporting a bale band buckle with one end of the band extending over the buckle, means for inserting the end of the band through the buckle, means for crimping the end of the band around the buckle, and means for withdrawing the supporting means.

3. In an apparatus for the purpose set forth, the combination of means for supporting a buckle with a bale band extending over the same, means for inserting the band through the buckle, means for crimping the band about the buckle and retaining the band in alinement with the buckle, means for withdrawing the means for retaining the band in alinement with the buckle, and means for supporting the buckle while withdrawing said retaining means.

4. In an apparatus for the purpose set forth, the combination of a bale band buckle support, means on said support for holding the end of a bale band over the buckle, means for inserting the end of the bale band through the buckle, means for simultaneously crimping the band upon the buckle and withdrawing the buckle support, and means for holding the buckle while the support is withdrawn.

5. The combination of a bale band buckle support, a retainer on said support to hold a bale band in alinement with the buckle, means on the support for crimping the band upon the buckle, means for inserting the band through the buckle, and means acting on the support to move the same from the buckle and thereby effect a crimping of the band and subsequently shift the support to release the band.

6. In an apparatus for the purpose set forth, the combination with means for supporting a bale band buckle and retaining the end of a band over the buckle, means for trimming an end of the band, means for inserting the trimmed end of the band through the buckle, and means for crimping the said end of the band upon the buckle and subsequently releasing the buckle and the band.

7. In an apparatus for the purpose set forth, the combination of means for supporting a buckle and an end of a bale band over the buckle, means for trimming the end of the band, means for inserting the trimmed end through the buckle, means for crimping the end of the band upon the buckle, means for releasing the buckle and the band, and means for ejecting the waste trimmed from the band.

8. In an apparatus for the purpose set forth, the combination of a buckle support, a finger adapted to force an end of a band through a buckle on said support, means for crimping the band upon the buckle, means for engaging the buckle and holding the same while the band is being crimped and the buckle support removed from the buckle, and means for releasing the said last-mentioned means from the buckle and then shifting the buckle support to release the band and the buckle.

9. In an apparatus for the purpose set forth, the combination of a plunger constructed to receive and support a bale-band buckle, a finger adapted to force an end of a bale-band through a buckle while the same is supported on the plunger, means for rocking said finger, and means for moving the plunger to carry the same from the buckle and effect a crimping of the band upon the buckle.

10. The combination of a plunger having a seat at its lower end for a bale-band buckle, a rock shaft, a finger carried by said rock shaft and having its free end adapted to bear against a bale band extending across said seat and force said band through a buckle in the seat, said finger being laterally offset to permit the free end of the band to pass, means on the plunger to crimp the band upon the buckle, means for moving the plunger vertically to effect said crimping, and means for moving the plunger laterally to release the same from the bale band and the buckle.

11. The combination of a plunger having a lateral offset at its lower end and having an upstanding arm at the end of said offset, a buckle seat being formed in the plunger, the offset and the said upstanding arm, a crimping roller carried by the plunger and said upstanding arm, a finger adapted to force the end of a bale band through a buckle placed in said seat, means for sliding the plunger to carry the crimping roller against the end of the band and crimp the same over the buckle, and means for shifting the plunger laterally to move the same from under the buckle and the band.

12. The combination of a plunger having a buckle seat at its lower end and provided with a crimping member in rear of said seat, a finger adapted to move through said seat and thereby force the end of a bale band through a buckle in the seat, a dog adapted to engage a buckle held in said seat after the end of the band has been inserted therethrough, and means for moving the plunger in a rectilinear path away from the buckle while it is engaged by said dog to crimp the end of a band thereover.

13. The combination of a rock shaft having a finger projecting forwardly downwardly and rearwardly therefrom, a plunger disposed in rear of said shaft, a second rock shaft below the first-mentioned shaft, a dog carried by said second rock shaft, means for rocking the first-mentioned shaft to carry the finger thereon to and away from the plunger, means whereby rocking of said shaft will effect rocking of the second shaft to permit the dog to drop toward the plunger, means for actuating the plunger, and means whereby said actuation will move the dog away from the plunger.

14. In an apparatus for the purpose set forth, the combination of a rock shaft, a finger carried thereby to insert a band through a buckle, an operating lever fixed to said shaft, a trigger pivotally hung upon said lever, a second rock shaft, a dog on said rock shaft to engage a buckle after the band has been inserted therethrough, a trip on said rock shaft adjacent said trigger, and a rest upon which said trip is normally supported, the trigger being constructed to ride over the trip upon its downward movement and to engage the trip and move it from the rest on its upward movement.

15. In an apparatus for the purpose set forth, the combination of a rock shaft, a dog thereon adapted to engage and hold a bale band buckle, means for normally holding said rock shaft with the dog out of engagement with the bale band buckle, means for releasing the shaft whereby to permit the dog to engage the buckle, and other means for returning the shaft to its initial normal position.

16. In an apparatus for the purpose set forth, the combination of a rock shaft, a dog thereon adapted to engage a bale band buckle, means for normally holding the said shaft with the dog out of engagement with the buckle, means for releasing the shaft to permit the dog to engage the buckle, a lever pivoted between its ends and arranged above the shaft, a crank arm on the shaft, a link connecting the crank arm with the lever, and means for oscillating the lever and thereby cause the shaft to release the dog from the buckle.

17. In an apparatus for the purpose set forth, the combination of a base plate provided with band-receiving openings, a rock shaft disposed above said openings, means for rocking said shaft, a series of fingers carried by the shaft and adapted to force bale bands through said openings, a series of plungers slidably mounted upon the base plate and adapted to guide and support bale bands in position to be engaged by said fingers, means on the base plate for moving said plungers vertically to effect crimping of the bale bands, and means for shifting the plungers laterally to release the crimped bands.

18. In an apparatus for the purpose set forth, the combination of a base plate having guide flanges at its ends, racks on said plate adjacent said guide flanges, a rock shaft having sliding bearings in the said guide flanges, quadrants secured to said shaft and engaging said racks, a beam slidably mounted upon said shaft, an arm extending radially from one of said quadrants, an operating lever pivotally connected to said arm, whereby movement of the lever in one direction will rock said arm and quadrants and movement in an intersecting plane will leave the quadrants at rest, and connections between the lever and beam whereby the beam may be shifted longitudinally upon the shaft.

19. In an apparatus for the purpose set forth, the combination of a base plate, means mounted on the base plate for trimming a bale band and crimping the same upon a bale band buckle, and a bracket upon the base plate for supporting the trimming mechanism and guiding a bale band thereto.

20. In an apparatus for the purpose set forth, the combination of a base plate, a stationary knife secured thereon, a bracket upon the base plate having a projection forming a support for said knife and a guide to direct the band over the knife, and a movable knife mounted upon the base plate and adapted to move against the band supported over the first-mentioned knife.

21. In an apparatus for the purpose set forth, the combination of a base plate, a stationary knife supported thereon, a rock shaft mounted on the base plate above the stationary knife, a hub secured upon said shaft, a knife secured to and disposed laterally of said hub to move against a bale band held over the stationary knife, means for rocking said shaft, and a finger carried by said shaft and adapted to insert a bale band through a buckle.

22. In an apparatus for the purpose set forth, the combination of a base plate, a rock shaft mounted thereon, a hub secured to the rock shaft, a knife secured to said hub and extending laterally therefrom in spaced relation to the shaft, a stationary knife coacting with the first-mentioned knife, and an ejector upon the hub in rear of the knife carried thereby.

23. In an apparatus for the purpose set forth, the combination of a base plate, a rock shaft mounted thereon, a finger carried by said rock shaft and adapted to force a bale band through a buckle, and a knife carried by the shaft and extending laterally from its point of attachment in spaced relation to the shaft, the finger being laterally offset whereby its free end will be in the plane of the knife.

24. In an apparatus for the purpose set forth, the combination of a base plate, a stationary knife supported thereon, a guide on the base plate to hold the end of a bale band over said knife, a movable knife mounted on the base plate and coacting with the stationary knife to trim the band, and an ejector moving with the movable knife.

25. In an apparatus for the purpose set forth, the combination of a base plate provided with band-receiving openings, buckle seats adapted to support buckles over said openings, the upper walls of the openings being beveled downwardly and rearwardly whereby bands attached to buckles and passing through the openings will exert tension on the buckles to hold the same to the seats, means for attaching the free ends of the bands to the buckles, and means for withdrawing the seats to release the buckles and attached bands.

26. In an apparatus for the purpose set forth, the combination of a buckle seat, a retainer below the seat and having one end free to permit the lateral insertion of a portion of a bale band to extend over a buckle on the seat, means for attaching the band to the buckle, and means for releasing the seat from the buckle and the retainer from the band.

27. The combination with a compress having a platen, of a base plate secured to the platen and projecting beyond the working face of the same, the projecting portion of the base plate being constructed with a plurality of equidistant bale-band guides.

28. The combination with a compress having a platen, of a base plate secured to the side of the platen and projecting beyond the working face of the same, the projecting portion of the base plate having a plurality of bale-band guides, and means for permitting longitudinal adjustment of the base plate.

29. In an apparatus for the purpose set forth, the combination of a base plate, a stationary knife supported thereon, a movable knife mounted on the base plate and coacting with the stationary knife to trim a band, and an ejector to remove the waste.

30. In an apparatus for the purpose set forth, the combination of a base plate provided with band-receiving openings, buckle seats to support buckles over said openings with bands attached thereto and extending through the openings, means for placing the bands under tension to hold the buckles to their seats, and means for attaching the free ends of the bands to the buckles.

31. In an apparatus for the purpose set forth, the combination of bale-band buckle seats for supporting buckles with bands attached at one end thereto, means for inserting the free ends of the bands through the buckles, means for holding the buckles while the ends of the bands are crimped thereon, means for crimping the bands, and means whereby the actuation of the means for inserting the bands through the buckles will cause the said holding means to engage the buckles.

32. In an apparatus for the purpose set forth, the combination of bale-band buckle seats for supporting buckles with bands attached at one end thereto, means for inserting the free ends of the bands through the buckles, means for holding the buckles while the ends of the bands are crimped thereon, means for crimping the bands, means whereby the actuation of the means for inserting the bands through the buckles will cause said holding means to engage the buckles, and means whereby the operation of the crimping means will release said holding means from the buckles and return said means to normal position.

33. In an apparatus for the purpose set forth, the combination of bale-band buckle seats for supporting buckles with bands attached at one end thereto, means for inserting the free ends of the bands through the buckles, means for holding the buckles while the ends of the bands are crimped thereon, means whereby when the ends of the bands are inserted through the buckles the said holding means will be shifted laterally and engaged in the buckles, means for reciprocating the seats to crimp the free ends of the bands upon the buckles and to shift the seats laterally to remove them from the planes of the bands and then return them to said planes, and means whereby when the seats reach their lowest positions the holding means will be released from the buckles and when the seats are shifted laterally the said holding means will be returned to their initial positions.

In testimony whereof, I affix my signature.

ELVIS L. BARNES. [L. S.]

Copies of this patent may be obtained for five cents each, by addressing the "Commissioner of Patents, Washington, D. C."